(12) United States Patent
Plasmeier et al.

(10) Patent No.: US 9,426,626 B2
(45) Date of Patent: Aug. 23, 2016

(54) LOCATION UNCERTAINTY IN SEARCH

(71) Applicant: Yahoo! Inc., Sunnyvale, CA (US)

(72) Inventors: Michael Plasmeier, Mountain View, CA (US); Anand Tolani, Saratoga, CA (US)

(73) Assignee: YAHOO! Inc., Sunnyvale, CA (US)

(*) Notice: Subject to any disclaimer, the term of this patent is extended or adjusted under 35 U.S.C. 154(b) by 0 days.

(21) Appl. No.: 14/588,303

(22) Filed: Dec. 31, 2014

(65) Prior Publication Data

US 2016/0192150 A1    Jun. 30, 2016

(51) Int. Cl.
*G06F 17/30* (2006.01)
*H04W 4/02* (2009.01)

(52) U.S. Cl.
CPC .......... *H04W 4/027* (2013.01); *G06F 17/3053* (2013.01); *G06F 17/30241* (2013.01); *G06F 17/30345* (2013.01)

(58) Field of Classification Search
CPC ............ H04W 4/027; G06F 17/30241; G06F 17/30345; G06F 17/3053
USPC ............. 455/456.1, 456.2, 456.3, 456.6, 458
See application file for complete search history.

(56) References Cited

U.S. PATENT DOCUMENTS

| | | | |
|---|---|---|---|
| 8,626,774 B2* | 1/2014 | Avadhanam | G06F 17/3053 707/748 |
| 2013/0097162 A1* | 4/2013 | Corcoran | G06F 17/30241 707/724 |
| 2013/0337838 A1* | 12/2013 | Kolodziej | G06F 17/3087 455/456.3 |
| 2014/0032533 A1* | 1/2014 | Hersans | G06F 17/30554 707/722 |
| 2014/0095580 A1* | 4/2014 | Sartini | H04W 4/023 709/203 |
| 2015/0169794 A1* | 6/2015 | Maennel | G06F 17/5009 703/2 |

OTHER PUBLICATIONS

Seth, et al, "System and Method for Address Based Locations," U.S. Appl. No. 14/308,573, filed Jun. 18, 2014, 44 Pages.

* cited by examiner

*Primary Examiner* — Siu Lee
(74) *Attorney, Agent, or Firm* — Berkeley Law & Technology Group, LLP

(57) ABSTRACT

A method and apparatus for providing search results based at least in part on uncertainty.

18 Claims, 4 Drawing Sheets

100 m
95%

1 km
95%

5 km
95%

Standard Normal Distribution Table

| z | .00 | .01 | .02 | .03 | .04 | .05 | .06 | .07 | .08 | .09 |
|---|---|---|---|---|---|---|---|---|---|---|
| 0.0 | .0000 | .0040 | .0080 | .0120 | .0160 | .0199 | .0239 | .0279 | .0319 | .0359 |
| 0.1 | .0398 | .0438 | .0478 | .0517 | .0557 | .0596 | .0636 | .0675 | .0714 | .0753 |
| 0.2 | .0793 | .0832 | .0871 | .0910 | .0948 | .0987 | .1026 | .1064 | .1103 | .1141 |
| 0.3 | .1179 | .1217 | .1255 | .1293 | .1331 | .1368 | .1406 | .1443 | .1480 | .1517 |
| 0.4 | .1554 | .1591 | .1628 | .1664 | .1700 | .1736 | .1772 | .1808 | .1844 | .1879 |
| 0.5 | .1915 | .1950 | .1985 | .2019 | .2054 | .2088 | .2123 | .2157 | .2190 | .2224 |
| 0.6 | .2257 | .2291 | .2324 | .2357 | .2389 | .2422 | .2454 | .2486 | .2517 | .2549 |
| 0.7 | .2580 | .2611 | .2642 | .2673 | .2704 | .2734 | .2764 | .2794 | .2823 | .2852 |
| 0.8 | .2881 | .2910 | .2939 | .2967 | .2995 | .3023 | .3051 | .3078 | .3106 | .3133 |
| 0.9 | .3159 | .3186 | .3212 | .3238 | .3264 | .3289 | .3315 | .3340 | .3365 | .3389 |
| 1.0 | .3413 | .3438 | .3461 | .3485 | .3508 | .3531 | .3554 | .3577 | .3599 | .3621 |
| 1.1 | .3643 | .3665 | .3686 | .3708 | .3729 | .3749 | .3770 | .3790 | .3810 | .3830 |
| 1.2 | .3849 | .3869 | .3888 | .3907 | .3925 | .3944 | .3962 | .3980 | .3997 | .4015 |
| 1.3 | .4032 | .4049 | .4066 | .4082 | .4099 | .4115 | .4131 | .4147 | .4162 | .4177 |
| 1.4 | .4192 | .4207 | .4222 | .4236 | .4251 | .4265 | .4279 | .4292 | .4306 | .4319 |
| 1.5 | .4332 | .4345 | .4357 | .4370 | .4382 | .4394 | .4406 | .4418 | .4429 | .4441 |
| 1.6 | .4452 | .4463 | .4474 | .4484 | .4495 | .4505 | .4515 | .4525 | .4535 | .4545 |
| 1.7 | .4554 | .4564 | .4573 | .4582 | .4591 | .4599 | .4608 | .4616 | .4625 | .4633 |
| 1.8 | .4641 | .4649 | .4656 | .4664 | .4671 | .4678 | .4686 | .4693 | .4699 | .4706 |
| 1.9 | .4713 | .4719 | .4726 | .4732 | .4738 | .4744 | .4750 | .4756 | .4761 | .4767 |
| 2.0 | .4772 | .4778 | .4783 | .4788 | .4793 | .4798 | .4803 | .4808 | .4812 | .4817 |
| 2.1 | .4821 | .4826 | .4830 | .4834 | .4838 | .4842 | .4846 | .4850 | .4854 | .4857 |
| 2.2 | .4861 | .4864 | .4868 | .4871 | .4875 | .4878 | .4881 | .4884 | .4887 | .4890 |
| 2.3 | .4893 | .4896 | .4898 | .4901 | .4904 | .4906 | .4909 | .4911 | .4913 | .4916 |
| 2.4 | .4918 | .4920 | .4922 | .4925 | .4927 | .4929 | .4931 | .4932 | .4934 | .4936 |
| 2.5 | .4938 | .4940 | .4941 | .4943 | .4945 | .4946 | .4948 | .4949 | .4951 | .4952 |
| 2.6 | .4953 | .4955 | .4956 | .4957 | .4959 | .4960 | .4961 | .4962 | .4963 | .4964 |
| 2.7 | .4965 | .4966 | .4967 | .4968 | .4969 | .4970 | .4971 | .4972 | .4973 | .4974 |
| 2.8 | .4974 | .4975 | .4976 | .4977 | .4977 | .4978 | .4979 | .4979 | .4980 | .4981 |
| 2.9 | .4981 | .4982 | .4982 | .4983 | .4984 | .4984 | .4985 | .4985 | .4986 | .4986 |
| 3.0 | .4987 | .4987 | .4987 | .4988 | .4988 | .4989 | .4989 | .4989 | .4990 | .4990 |
| 3.1 | .4990 | .4991 | .4991 | .4991 | .4992 | .4992 | .4992 | .4993 | .4993 | .4993 |
| 3.2 | .4993 | .4993 | .4994 | .4994 | .4994 | .4994 | .4994 | .4995 | .4995 | .4995 |
| 3.3 | .4995 | .4995 | .4995 | .4996 | .4996 | .4996 | .4996 | .4996 | .4996 | .4997 |
| 3.4 | .4997 | .4997 | .4997 | .4997 | .4997 | .4997 | .4997 | .4997 | .4997 | .4998 |
| 3.5 | .4998 | .4998 | .4998 | .4998 | .4998 | .4998 | .4998 | .4998 | .4998 | .4998 |

LOCATION UNCERTAINTY IN SEARCH

FIELD

The subject matter disclosed herein relates generally to device location uncertainty and generating search results in light thereof.

INFORMATION

Ranking of search results generated in response to a search query may take into account a number of possible factors. For instance, a device may be employed by a user to submit a search query to a search engine. Typically, if known, location of a device submitting a search query may, in some cases, be employed to generate and/or rank search results. However, device location may not always be available.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Figure 1:
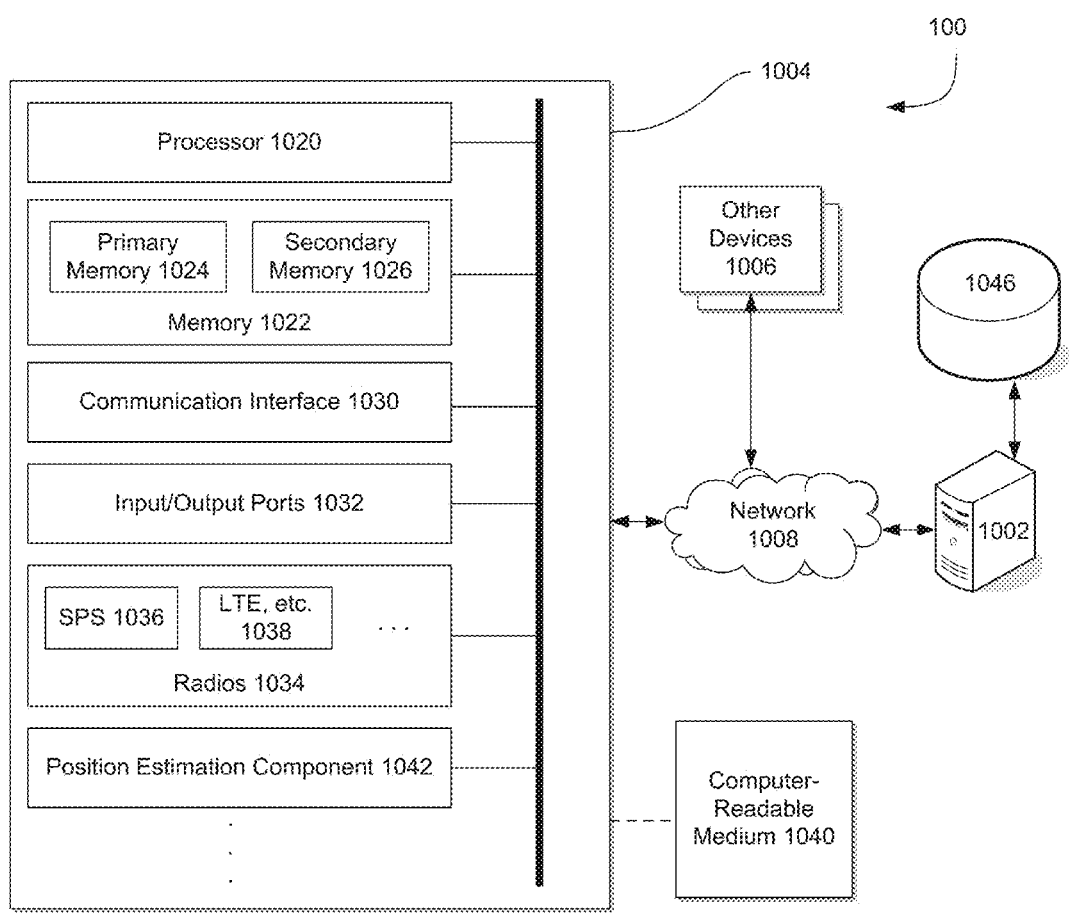
FIG. 1 is a block diagram illustrating a system embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a computational problem may be allocated among computing devices, including one or more clients and one or more servers, via a computing and/or communications network, for example.

A network may comprise two or more network devices and/or may couple network devices so that signal communications, such as in the form of signal packets and/or frames, for example, may be exchanged, such as between a server and a client device and/or other types of devices, including between wireless devices coupled via a wireless network, for example.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

The Internet refers to a decentralized global network of interoperable networks that comply with the Internet Protocol (IP). It is noted that there are several versions of the Internet Protocol. Here, the term Internet Protocol or IP is intended to refer to any version, now known and/or later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a sub-portion of the Internet that complies with the Hypertext Transfer Protocol or HTTP. For example, network devices may engage in an HTTP session through an exchange of Internet signal packets and/or frames. It is noted that there are several versions of the Hypertext Transfer Protocol. Here, the term Hypertext Transfer Protocol or HTTP is intended to refer to any version, now known and/or later developed. It is likewise noted that in various places in this document substitution of the term Internet with the term World Wide Web may be made without a significant departure in meaning and may, therefore, not be inappropriate in that the statement would remain correct with such a substitution.

Although claimed subject matter is not in particular limited in scope to the Internet or to the Web, it may without limitation provide a useful example of an embodiment for purposes of illustration. As indicated, the Internet may comprise a worldwide system of interoperable networks, including devices within those networks. The Internet has evolved to a public, self-sustaining facility that may be accessible to tens of millions of people or more worldwide. Also, in an embodiment, and as mentioned above, the terms "WWW" and/or "Web" refer to a sub-portion of the Internet that complies with the Hypertext Transfer Protocol or HTTP. The web, therefore, in this context, may comprise an Internet service that organizes stored content, such as, for example, text, images, video, etc., through the use of hypermedia, for example. A HyperText Markup Language ("HTML"), for example, may be utilized to specify content and/or format of hypermedia type content, such as in the form of a file or an "electronic document," such as a web page, for example. An Extensible Markup Language ("XML") may also be utilized to specify content and/or format of hypermedia type content, such as in the form of a file or an "electronic document," such as a web page, in an embodiment. Of course, HTML and XML are merely example languages provided as illustrations and, furthermore, HTML and/or XML is intended to refer to any version, now known and/or later developed. Likewise, claimed subject matter is not intended to be limited to examples provided as illustrations, of course.

The term "web site" and/or similar terms refer to a collection of related web pages, in an embodiment. The term "web page" and/or similar terms refer to any electronic file and/or electronic document, such as may be accessible via a network, by specifying a uniform resource locator (URL) for accessibility via the web, in an example embodiment. As alluded to above, a web page may comprise content coded using one or more languages, such as, for example, HTML and/or XML, in one or more embodiments. Although claimed subject matter is not limited in scope in this respect. Also, in one or more embodiments, developers may write code in the form of JavaScript, for example, to provide content to populate one or more templates, such as for an application. Here, JavaScript is intended to refer to any now known or future versions. However, JavaScript is merely an example programming language. As was mentioned, claimed subject matter is not limited to examples or illustrations.

Terms including "entry", "electronic entry", "document", "electronic document", "content", "digital content", "item", and/or similar terms are meant to refer to signals and/or states in a format, such as a digital format, that is perceivable by a user, such as if displayed and/or otherwise played by a device, such as a digital device, including, for example, a computing device. In an embodiment, "content" may comprise one or more signals and/or states to represent physical measurements generated by sensors, for example. For one or more embodiments, an electronic document may comprise a web page coded in a markup language, such as, for example, HTML (hypertext markup language). In another embodiment, an electronic document may comprise a portion and/or a region of a web page. However, claimed subject matter is not limited in these respects. Also, for one or more embodiments, an electronic document and/or electronic entry may comprise a number of components. Components in one or more embodiments may comprise text, for example as may be displayed on a web page. Also for one or more embodiments, components may comprise a graphical object, such as, for example, an image, such as a digital image, and/or sub-objects, such as attributes thereof. In an embodiment, digital content may comprise, for example, digital images, digital audio, digital video, and/or other types of electronic documents.

In one embodiment, a search engine may be used to assist to locate desired content and/or web pages. By way of non-limiting example, an index of websites and/or web pages, content, URLs, etc., such as in one or more databases, for example, may be used to respond to a query, such as a search query, for a desired document, content, and/or website, by way of example. After receiving a search query, for example, a search engine may be capable of employing such databases and returning search results to a device in response to a submitted query. In this context, submitting a search query and/or similar terms refers to making a request for content electronically, such via an electronic communication, but is otherwise not intended to be limited to a particular format or approach. Thus, a search query is not limited to use of an API, for example.

Signal packets and/or frames, also referred to as signal packet transmissions and/or signal frame transmissions, and may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path comprising a portion of the Internet, from a site via an access node coupled to the Internet. Likewise, a signal packet and/or frame may be forwarded via network nodes to a target site coupled to a local network, for example. A signal packet and/or frame communicated via the Internet, for example, may be routed via a path comprising one or more gateways, servers, etc. that may, for example, route a signal packet and/or frame in accordance with a target and/or destination address and availability of a network path of network nodes to the target and/or destination address. Although the Internet comprises a network of interoperable networks, not all of those interoperable networks are necessarily available and/or accessible to the public.

A network protocol refers to a set of signaling conventions for computing and/or communications between and/or among devices in a network, typically network devices; for example, devices that substantially comply with the protocol and/or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance and/or substantial compatibility.

The Web and/or the Internet have increasingly become a repository of content. Users are increasingly turning to it to access content of various sorts. Thus, as the volume of Internet content increases, so too does an interest in finding and/or returning relevant content in response to search queries. Likewise, with increasing amounts of content on the Internet, challenges, such as locating relevant search results and/or filtering out potentially irrelevant search results, increase. For instance, in many cases, users may not be able to find relevant search results without scrolling down a search results page, continuing to subsequent pages of search results, and/or submitting multiple queries.

A variety of techniques have been pursued to provide more relevant search results including, by way of non-limiting example, ranking potential search results based at least in part on a number of potentially relevant factors. In one embodiment, possible factors may include, for example, demographics, preferences, search history, and/or location, among other things. With increasing proliferation of mobile devices, such as mobile telephones, tablets, etc., using location, such as of a mobile device, such as, for example, an estimated location of a device, at least in part, as a factor in ranking search results may be desirable. For example, for search queries related to topics with a corresponding physical location (e.g., queries for restaurants and/or stores), location of a device submitting the particular query may potentially be taken into account to rank potential search results. However, in a variety of situations, location of that device may not be available or, even if available, it may not be sufficiently precise.

Location determination, location estimation and/or similar terms refer to estimating an approximate location for a device, in this context. In one non-limiting embodiment, location of a device may be determined based at least in part on, by way of example, a location determination made using satellite positioning radio signals (e.g., GPS), a location determination made using signal triangulation of service signals (e.g., triangulation using cellular base stations), an IP address of the device, and/or user input, among other things.

Thus, for example, a device may transmit one or more suitable location-related signals that may be capable of being employed in connection with a search query, for example. However, some operating systems and/or application programs (e.g., Web browsers) may request permission of a user before making location-related signals available. For instance, some operating systems, such as, by way of non-limiting example, iOS or Android, may prompt user approval prior to transmission of signals related to device location. Further, some programs, like a Firefox web browser, by way of non-limiting example, may also present a user with a prompt.

Thus, for these, as well as other situations, there may be a desire to deal with device location in a non-deterministic manner. For instance, there may be a desire to search and/or rank generated search results even if device location is not precisely known. For example, it may be perceived as desirable to reduce user interactions that may potentially be viewed as annoying and/or may raise privacy concerns for a user. Thus, prompting a user for authorization may not be perceived as desirable in some cases. Likewise, it may be recognized that in some situations, device location may not be capable of being easily determined with a desired level of precision.

For purposes of illustration, FIG. 1 is an illustration of a system embodiment 100 that may be employed in a client-server type interaction, such as described infra. in connection with providing search results to a device, such as a network device and/or a computing device, for example. In FIG. 1, computing device 1002 may interface with computing device 1004, which may comprise features of a client computing device, for example, while computing device 1002 may comprise features of a server device. Computing device 1002 may be in communication with one or more databases, such as database 1046, which may reside on computing device 1002 or may be stored on one or more other computing devices, such as for a distributed system of computing devices with computing device 1002 in communication with one or more devices in the distributed system, for example. One or more databases, such as 1046, for example, may provide access to content to be searched and/or to be stored, such as user browsing habits, user preferences, and/or user demographics, among other things.

Communications interface 1030, processor (e.g., processing unit) 1020, and memory 1022, which may comprise primary memory 1024 and secondary memory 1026, may communicate by way of a communication bus, for example. In FIG. 1, computing device 1002 may represent one or more sources of analog, uncompressed digital, lossless compressed digital, and/or lossy compressed digital formats for content of various types, such as video, imaging, text, audio, etc. in the form physical states and/or signals, for example. Computing device 1002 may communicate with computing device 1004 by way of a connection, such as an internet connection, via network 1008, for example. Computing device 1004 may also comprise input/output ports 1032, one or more radios 1034 such as, for example, a satellite positioning system (SPS) radio 1036, a cellular radio, such as one that may substantially comply with LTE (e.g., LTE 1038 in FIG. 1), among other things. Computing device 1004 may also comprise a position estimation component 1042, which may be independent from, or combined with one or more of the preceding components. Although computing device 1004 of FIG. 1 shows the above-identified components, claimed subject matter is not limited to computing devices having these components as other implementations may include alternative arrangements that may comprise additional components or fewer components, such as components that may operate differently, but may provide similar results. Rather, examples are provided merely as illustrations. It is not intended that claimed subject matter be limited in scope to illustrative examples.

Processor 1020 may be representative of one or more circuits, such as digital circuits, to perform at least a portion of a computing procedure and/or process. By way of example, but not limitation, processor 1020 may comprise one or more processors, such as controllers, microprocessors, microcontrollers, application specific integrated circuits, digital signal processors, programmable logic devices, field programmable gate arrays, the like, or any combination thereof. In implementations, processor 1020 may perform signal processing to manipulate signals and/or states, to generate signals and/or states, etc., for example.

Memory 1022 may be representative of any storage mechanism. Memory 1020 may comprise, for example, primary memory 1022 and secondary memory 1026, additional memory circuits, mechanisms, or combinations thereof. Memory 1020 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 1020 may be utilized to store a program. Memory 1020 may also comprise a memory controller for accessing computer readable-medium 1040 that may carry and/or make accessible content, which may include code, and/or instructions, for example, executable by processor 1020 and/or some other component, such as a controller and/or processor, capable of executing instructions, for example.

Under direction of processor 1020, memory, such as memory cells storing physical states, representing, for example, a program, may be executed by processor 1020 and generated signals may be transmitted via the Internet, for example. Processor 1020 may also receive digitally-encoded signals from computing device 1002.

Input/output ports 1032 may comprise any suitable form of input and/or output mechanism capable of transmitting signal packets and/or receiving transmissions of signal packets. For example, in one embodiment, input/output ports 1032 may comprise one or more physical device ports such as, for example, one or more Universal Serial Bus (USB) ports. Other examples include, but are not limited to, display ports, Video Graphics Array (VGA) ports, and/or Ethernet ports, to name but a few examples. It is noted that references to USB, VGA and/or Ethernet are intended to encompass past, present and/or future versions of such publicly available standards and/or specifications.

Network 1008 may comprise one or more network communication links, processes, services, applications and/or resources to support exchanging communication signals between a computing device, such as 1002, and other computing devices 1006, which may, for example, comprise one or more servers (not shown) or other computing devices also in communication with computing device 1002 via network 1008. By way of example, but not limitation, network 1008 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 1004, as depicted in FIG. 1, is merely one example, and claimed subject matter is not limited in scope to this particular example. For one or more embodiments, a computing device may comprise any of a wide range of digital electronic devices, including, but not limited to, personal desktop and/or notebook computers, tablets, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform (e.g., computing device).

Memory 1022 may store cookies relating to one or more users and may also comprise a computer-readable medium that may carry and/or make accessible content, including code and/or instructions, for example, executable by processor 1020 and/or some other component, such as a controller and/or processor, capable of executing instructions, for example. A user may make use of an input device (e.g., such as via input/output ports 1032), such as a computer mouse, stylus, track ball, keyboard, and/or any other similar device capable of receiving user actions and/or motions as input signals. Likewise, a user may make use of an output device (e.g., such as via input/output ports 1032), such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Radios 1034 (e.g., capable of transmitting and/or receiving a radio frequency signal) of computing device 1004 may comprise components capable of using any of the foregoing wireless network access technologies (by way of example, but not limitation), but it may also include any other equivalent and/or suitable technologies now existing, or to be developed later. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like. In one embodiment, one or more of the foregoing technologies may be used by a computing device to estimate a device location, for example Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise an attached or detachable smart card that is able to store subscription content of a user, and/or is also able to store a contact list of the user. A user may own the computing device and/or networking device or may otherwise be a user thereof, such as a primary user thereof, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

In one embodiment, a location of a device may be estimated based, at least in part, on signals from a source other than the device. In one implementation, it may be possible to search content and/or rank search results based at least in part on a location estimate from other sources. As such, concern as to possible annoyances and/or privacy may be lessened, among other things. Of course, claimed subject matter is not limited in scope regarding the foregoing.

As noted above, ranking search results may be based, at least in part, on any number of possible factors. In one embodiment, potential factors for consideration in ranking may include, but are not limited to, location, user demographics, user browsing and/or search history, explicit and/or implicit user preferences, among other things. Location of a device may be estimated, by way of non-limiting example, via satellite positioning system radio (e.g., GPS), via triangulation of cellular stations, and/or via other sources external to the device (e.g., user location history), by way of non-limiting examples.

In one embodiment, a search query submitted via a mobile device may seek, for example, restaurants in the vicinity of the mobile device. Referring to FIG. 1, in one embodiment, computing device 1004 may comprise a mobile device and computing device 1002 may comprise one or more server devices, such as capable of generating, ranking and/or providing search results in response to a search query, for example. As discussed above, in one example, computing device 1004 may provide location-related signals, such as signal samples (e.g., signal packets) indicating one or more geographic coordinates (e.g., geographic longitude and latitude, and/or other location type coordinates, such as Universal Transverse Mercator (UTM), Universal Polar Stereographic (UPS), Where On Earth Identifiers (WOEID), coordinates etc.). Briefly, WOEID refers to unique non-repetitive geographic coordinates (e.g., 32-bit identifier) to facilitate Web-type services (e.g., queries to search engines, etc.). In one embodiment, WOEIDs may not be changed and/or recycled, after they have been assigned to a physical entity. Furthermore, it may be possible to assign a probability to geographic coordinates (e.g., WOEIDs) that may be used to facilitate Web-type services, by way of non-limiting example. It is noted that references to UTM, UPS, and/or WOEID is intended to encompass past, present and or future versions of these coordinate systems. In one embodiment, geographic coordinate signal samples may comprise longitude and/or latitude, one or more IP addresses, etc. Likewise, in one implementation, signal samples may comprise one or many possible location coordinate types, such as a single IP address or a plurality of IP addresses, for example. In one embodiment, for example, one or more signal samples comprising a location estimate may be transmitted along with a search query. By way of non-limiting example, one or more radios 1034 may work in concert with a position estimation component, such as 1042, to provide estimates and/or signal samples of use to generate location estimates. Additionally, other radios (e.g., a cellular radio such as 1038) may be capable of estimating location via signal triangulation using base station locations, by way of non-limiting example. The terms geographic coordinate signal samples, location signal samples, estimated location signal samples and/or similar terms may be used interchangeably, unless the particular context suggests otherwise. As referred to herein, these and/or other similar terms refer to one or more estimates of location in which the estimates are based at least in part on one or more externally derived signals.

In one embodiment, one or more location estimates may be received from a source other than from computing device 1004. As discussed above, in some cases, it may be desirable to forego use of such a feature. Rather, it may be desirable to instead receive location estimates from other, such as external, sources. In one embodiment, one or more estimates of location may be based at least in part on one or more IP addresses, such as currently and/or previously assigned to computing device 1004, such as dynamically. In one non-limiting example, one or more IP addresses may be assigned by a computing device (e.g., 1002) via a network (e.g., 1008) to facilitate routing of signal samples, etc. Thus, in an embodiment, one or more IP addresses may comprise one or more dynamic IP addresses. For example, as a mobile device (e.g., computing device 1004) moves into and/or travels through a given geographical area, communication may be established with one or more cellular towers. Thus, IP addresses may be dynamically assigned at different points along the device's path, for example. Likewise, addresses such as these may be stored by a network and may be accessible even after use, for example.

In one embodiment, it may be possible to estimate a location for a device based, at least in part, on the one or more IP addresses that may be and/or have been assigned. However, in at least some cases, a location estimated in such a fashion, such as from external sources, may be less precise than an estimate from the device, such as 1004 in this example. For example, location estimates based at least in part on IP addresses in large cities and/or other urban areas may be relatively precise; however, IP addresses may provide less precision for rural and/or other sparsely populated areas, for example. Furthermore, an estimated location within an area corresponding to an IP address may be relatively uncertain. For example, an area corresponding to an IP address may cover a relatively large area, and an estimated location within the area may therefore not have a desired level of precision. One or more embodiments of use of IP addresses to estimate location is discussed in U.S. patent application Ser. No. 14/308,573, filed on Jun. 18, 2014, entitled SYSTEM AND METHOD FOR ADDRESS BASED LOCATIONS. Of course, the foregoing are merely illustrative examples. It is not intended that claim subject matter be limited in scope in this respect.

As shall be discussed in more detail, if uncertainty regarding location is able to be reasonably quantified, it could potentially comprise a factor to be used for ranking search results for an embodiment, for example. Thus, it may be possible to use uncertainty as to a location estimate, such as may be based, at least in part, on an IP address. It is further observed that a relatively sizable uncertainty as to a location estimate may present some risk of potentially leading to improper ranking. For example, lack of precision as to a location estimate may lead to search ranking that may not be desired. Thus, approaches to handling device location uncertainty appropriately, such as to improve ranking of search results, may comprise an advance of the state of the art.

In this context, it is noted that it is desirable to draw a distinction between uncertainty and establishing a probable location region. Although uncertainty may have a variety of sources, in general, it may be viewed and/or understood as relating to a probability distribution governing a random variable. Thus, for example, in terms of an estimate and/or measurement of location, it is appropriate to consider device location to be a superposition (e.g., sum) of a deterministic component, which is, the desired physical location, and a random component, which here may comprise a random variable having a probability distribution. Although a variety of probability distributions may be possible for a random variable, as a result of the central limit theorem, it is reasonable and/or typical to employ a Gaussian (e.g., normal) distribution. Thus, one may consider uncertainty here to be a second order statistic with respect to a Gaussian distribution, generally referred to as the variance of the distribution. That is, variance, in general, provides a measure of spread of a distribution and, hence, likewise, may provide insight regarding uncertainty of an estimate of location. In contrast, a probable location region refers to a region which, with a particular degree of confidence, referred to as confidence level, includes the location of the device, for this example. Thus, a probable location region may reflect an acceptable boundary regarding device location for many situations.

As discussed above, it may be desirable to consider uncertainty in connection with ranking search results. By way of non-limiting example, for example, a location estimate generally has an associated uncertainty. Thus, in an embodiment, if quantifiable, uncertainty as to an estimate of device location may be contemplated in connection with ranking search results, for example, in an embodiment. As shall be illustrated with several potential embodiments, typically uncertainty may not be used necessarily directly in ranking; however, as shall be illustrated, uncertainty, if quantified, may be employed to generate a factor for use in ranking, for example.

Figure 3:
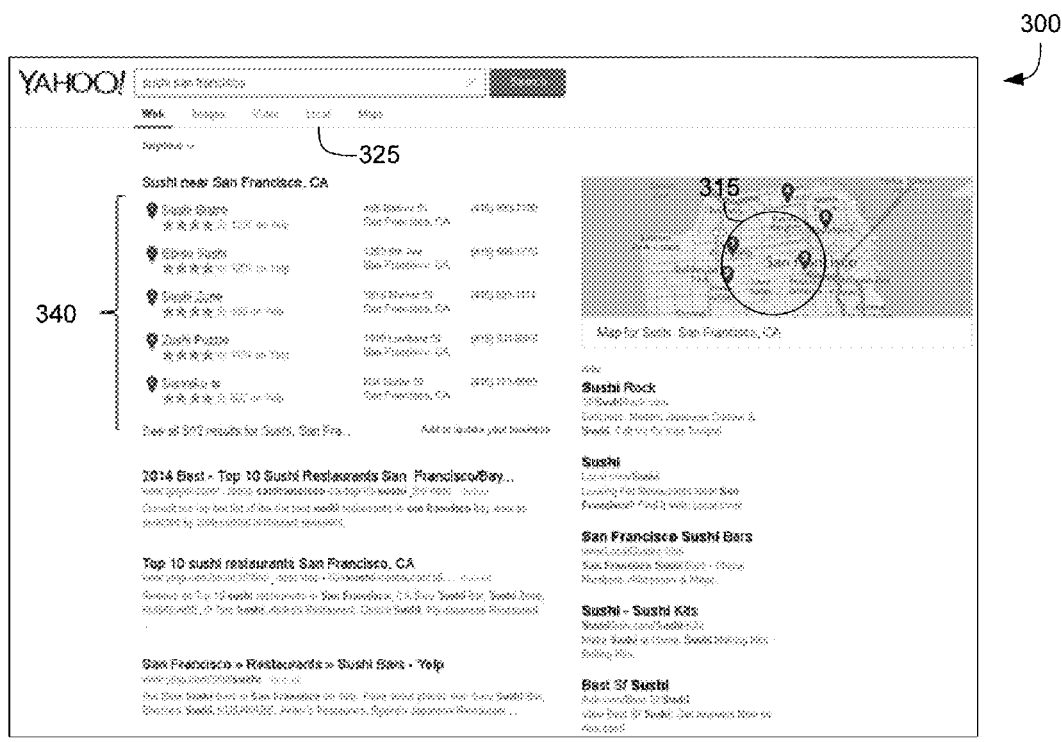
FIG. 3 is a screen shot illustrating an embodiment.

In one embodiment, as illustrated in FIG. 3, a search query and/or mapping system embodiment 300 may be usable for providing search results. For example, a search query may be entered, such as, for example, via a computing device, such as 1004 of FIG. 1. Thus, in an embodiment, signal samples comprising a search query, such as "sushi san francisco," as illustrated in FIG. 3, may be transmitted to a server operating as a portal for a search engine, for example. In one embodiment, search results, such as list of results 340, may be returned and may comprise, among other things, for example, a list of restaurants that serve sushi. Additionally, in one embodiment, returned search results may comprise results for a desired geographic area, such as, by way of non-limiting example, the city of San Francisco. In yet another embodiment, an estimate of location of a mobile device may be used, at least partly, to rank search results. In one non-limiting case, an estimate of location of a mobile device may be used in conjunction with a search query, such as a query as illustrated in FIG. 3, and search results may be prioritized based, at least in part, on an estimate of location of a mobile device, and further limited to San Francisco. For example, a search engine may determine that one or more possible search results corresponding to "sushi" are not in San Francisco, and thus may be removed from a list of search results, and an estimate of location of a mobile device may be used, at least in part, to prioritize remaining search results, such as, as transmitted to a mobile device, by way of non-limiting example.

In at least some cases, however, it may be possible to provide search results with greater precision, such than greater than a relatively large geo-political area, such as, for example, a city, such as San Francisco. A geo-political area or region refers to an area delineated by a political body, such as a government and/or authority of a country, province, state, region, and/or city, among other things. For example, it may be possible to rank search results and/or otherwise alter an order in which generated results may be provided, such as substantially according to an estimate of location, potentially with varying levels of granularity, in some embodiments, for example.

In one example, this may be achieved by, for example, ranking search results substantially in accordance with distance from a particular location, such as illustrated by 325. Alternatively, it may be possible to take location of the device into account, for instance, without direct input from a user, by employing a location estimate to rank search results. Of course, typically, any number of factors are taken into account to rank search results including, but not limited to, distance, quality, price, reputation, user preferences, and/or predictive factors (e.g., demographics), among other things. Further, it may be possible to weight one or more of such ranking factors relative to one or more other ranking factors. For example, a location estimate may be given less weight relative to other factors. Alternatively, it may be given more weight relative to other factors. In general, any number of possible factors may be weighted differently relative to other factors, of course.

In the case of a location estimate, as alluded to previously, there may be some uncertainty associated with an estimate. To appropriately account for some uncertainty, if a location estimate is to be used in connection with ranking search results, for example, a probable location region with a certain degree of confidence may be set so that a device location will be within the specified region with a specified degree of confidence.

By way of non-limiting example, if a location estimate is desired to have a confidence of 95%, then a probable location region may be used such that a location estimate may be situated within the region. For example, a radius surrounding the location estimate may be selected such that 19 times out of 20 (e.g., 95% of the time), the device is located within the region set. In one non-limiting example, therefore, for use in ranking search results, a location estimate may be received along with a radius having a 95% confidence level, as one example.

Figure 4:
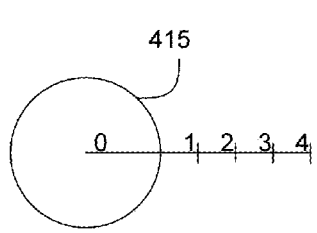
FIG. 4 is a diagram illustrating use of a radius in connection with confidence level according to an embodiment.
Figure 5A:
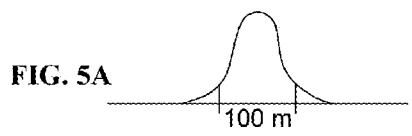
FIGS. 5A-5C illustrate various types of distributions.
Figure 5B:
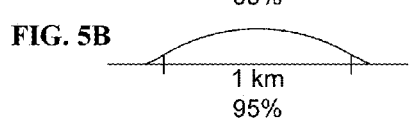
Figure 5C:
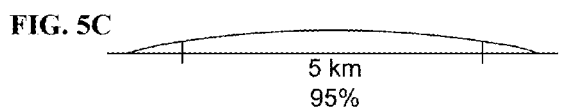

Probable location region (e.g., a radius in one embodiment) and confidence level may be more fully understood by reference to FIGS. 4 and 5, as described relative to an estimate of device location for an embodiment. FIG. 4 shows a circle 415 comprising a radius (represented in arbitrary units for this example). Thus, a centroid of circle 415 comprises an estimate of device location. A confidence level, such as 95%, may correspond to a probability that the device location falls within circle 415. Briefly, FIGS. 5A-5C illustrate probability distributions having different amounts of uncertainty as a result of having a different variance (e.g., spread). As such, in FIG. 5A, uncertainty is less as a result of a more concentrated probability distribution in comparison with FIGS. 5B and 5C, where uncertainty appears to be comparatively greater. Of course, the foregoing examples are not to be understood in a limiting sense.

Indeed, other factors other than device location may also exhibit uncertainty which may be accounted for in connection with ranking search results, in an embodiment. For instance, by way of non-limiting example, demographics such as age, wealth, political ideology, etc., may have an associated uncertainty that might be quantified for use in ranking search results, in an embodiment.

It is noted, however, that a region, such as encompassed by a closed curve, may comprise any suitable form or shape, such as an arbitrarily shaped area or region, or an established geo-political area (e.g., a city or a state), by way of non-limiting example. In one embodiment, a region may comprise a radial area or a polygon shaped area, by way of non-limiting example. A radial area may comprise a centroid and a distance from the centroid to the edge of the radial area. In some cases, a distance from a centroid to an edge may correspond to a radius having a particular confidence level, as discussed above. In another embodiment, a polygonal area may be used. As with a radial area; in an embodiment, a confidence level, which may be calculated, may be associated with a given polygon surrounding a location estimate. In an embodiment in which existing geo-political boundaries may be employed (e.g., as referred to by geographical coordinates, such as, a WOEID, etc.), a hierarchy of possible region-type boundaries may be employed, such as neighborhood, city, county, state, country, etc., so that a boundary may be employed in which a confidence level of at least a particular level, such as 95%, for example, is met via selection thereof (even if a greater confidence is met due, for example, to the size of the area).

In one example, a circle 315 in FIG. 3, may comprise an area or a region having at least a particular confidence level, such as 95%, as an example. In one embodiment, although circle 315 may not, as such, be visible on a map, nonetheless, the particular region may be used to rank possible search results. As was explained, circle 315, in this example, comprises an area in which a device is expected to be located with, for example, at least 95% confidence. In one embodiment, a ranking weight may correlate to a distance to an estimated location of a mobile device from search results, by way of non-limiting example. Thus, in one non-limiting example, search results identified within circle 315 may be ranked equivalently in terms of proximity to the device submitting the query. And, search results outside circle 315 may be subject to a weighting penalty in ranking, as an example, at least roughly corresponding to distance away from an estimated location, in an embodiment. In an alternate embodiment, a weighting penalty (again, as an example) in ranking may roughly correspond to a distance to an edge of circle 315 from outside circle 315. Of course, as shall be discussed in further detail hereinafter, a relationship between an estimated location of a mobile device, locations of search results, and a ranking weight may change based at least partially on different factors (e.g., uncertainty, confidence, etc.). For instance, a non-linear ranking weight may be desirable in certain cases (e.g., for search results outside walking distance) such as for a ranking with non-linear characteristics (e.g., with a slow ramp-up followed by a steep drop-off).

Consistent with the foregoing, entries corresponding to an estimated location of a computing device and/or a user may be accessible in one or more databases via a network, such as the internet, in one non-limiting example. For instance, in one case, different IP addresses corresponding to a device may be stored across one or more databases within a distributed system. An IP address may be stored, for example, after a user signs into a user account. A user may, of course, use a host of various mobile devices at a host of various locations. Thus, a distributed system may include a capability to track different IP addresses associated with various devices and/or account 'log ins' by a user.

As was mentioned above, one or more IP addresses may be associated with different geographical and/or geo-political locations. For example, a given IP address may be known to be associated with, for example, specific portions of different cities, such as, for example, Sunnyvale, Calif. Therefore, IP addresses may correspond to known geographic and/or geo-political locations that may also or alternatively result in particular device location estimates for corresponding IP addresses. As discussed, a location estimate may be a factor in ranking search results. In one embodiment, however, an IP address may correspond to a known area, however, it may nonetheless not necessarily permit an estimated device location to be generated with sufficient precision and/or certainty, such as if the region is relatively large. Thus, a location estimate in this example may not always be available having a desired level of confidence, unfortunately.

For a location estimate in which a probable location region having an acceptable level of confidence is available, uncertainty as to device location may be employed as a factor in ranking of search results. For instance, a location estimate may be provided a suitable weight and/or distances associated with particular search results may be given a suitable weight, such as for ranking purposes. As suggested, a variety of approaches to accounting for uncertainty as to a device location estimate may be employed, such as use of latitude and/or longitude, use of IP addresses, user history of IP addresses logged in the background and/or via explicit online check ins, etc. In one embodiment, uncertainty may increase and/or otherwise change based at least in part on a period of time having elapsed since generation of the location estimate, speed of a mobile device, etc. Changes in location estimate uncertainty over time may be handled in a variety of ways; however, even for a relatively simple linear approach to increasing uncertainty, long periods suggest greater uncertainty than shorter periods. Furthermore, other factors such as, for example, a routine of a user (e.g., whether a user is known to often be found at a location at a given time, etc.), estimates from one or more radios of a device, and/or environmental factors (e.g., temperature, noise, etc.), among other things may be employed in an embodiment to potentially modulate uncertainty in various ways.

Figure 2:
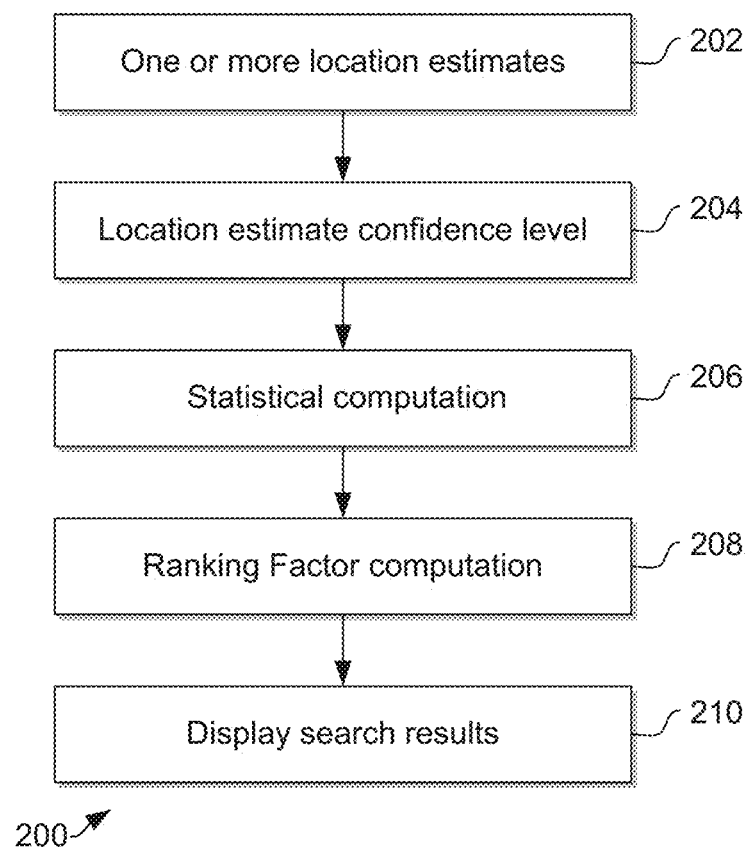
FIG. 2 is a flow diagram illustrating a method embodiment.

FIG. 2 illustrates a method embodiment 200 of providing a ranked list of search results. FIG. 2 is a flow diagram of an embodiment 200. Of course, embodiments are intended to be illustrative examples rather than be limiting with respect to claimed subject matter. Likewise, for ease of explanation, an embodiment may be simplified to illustrate aspects and/or features in a manner that is intended to not obscure claimed subject matter through excessive specificity and/or unnecessary details. Embodiments in accordance with claimed subject matter may include all of, less than, or more than blocks 202-210. Also, the order of blocks 202-210 is merely as an example order.

At a first block, 202, one or more location estimates for at least one device may, for example, be received and/or derived based at least in part on an external source. At block 204, a desired confidence level may be employed. In at least one embodiment, for example, a confidence level, such as 95%, may be set. In alternate embodiments, a user, a device, or an external source may specify a confidence level. At block 206, a computation may be performed based at least in part on a desired confidence level and a location estimate. As previously discussed, a variety of underlying statistical (e.g., probability density) distributions may be possible; however, typically a Gaussian distribution (also referred to as a normal distribution) may be employed as a result of the central limit theorem, shown by relation 1, for example. Thus, in an embodiment, a computation substantially in accordance with the following relationship may be performed:

$$f(x, \mu, \sigma) = \frac{1}{\sigma\sqrt{2\pi}} e^{-\frac{(x-\mu)^2}{2\sigma^2}} \quad \text{Relation 1}$$

where μ comprises a location estimate and σ comprises variance (e.g., spread or uncertainty), as previously described. In an embodiment, a cumulative distribution function (CDF) of a normal distribution may be employed, which may be more convenient for computing a ranking factor, also referred to here as a "distance penalty." For instance, let x=0 and σ=1. Likewise, at x=0, the CDF is equal to 0.5 since that point is the median of the normal distribution. Using these values, a CDF may be substantially in accordance with the following:

$$z = \frac{1}{\sqrt{2\pi}} \int_{-\infty}^{x} e^{-\frac{t^2}{2}} dt - 0.5 \quad \text{Relation 2}$$

Figure 6:
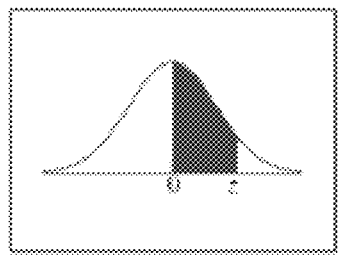
FIG. 6 is a Standard Normal Distribution table.

While the CDF may be calculated, in some embodiments, it may be possible to use a look-up table, such as the table provided in FIG. 6, to determine z. It is noted that the standard normal distribution table in FIG. 6 shows computed values for z. In one embodiment, z may comprise a part of a weight sometimes referred to herein as a distance penalty, for example.

Thus, at block 208, a ranking factor may be determined, as illustrated in detail immediately below by examples. Thus, illustrations of computation of a ranking factor are provided; however, these are merely illustrative examples and claimed subject matter is not intended to be limited in scope to these illustrative examples. Thus, for illustrative purposes, assume a radius of 100 m has been set for an embodiment, for example, with a 95% confidence level. Likewise, suppose a search result was determined to be 1 m from a location estimate. Scaling adjustments may be employed to compute z. Thus, for example, x in relation 2 above, may be computed as 2d/r, where d comprises 1 m and r comprises 100 m in this example. By computation, or via a table, such as FIG. 6, z therefore is 0.0080. However, to compute a ranking factor involves scaling adjustments. For example, the value of z is doubled since z comprises the area of a Gaussian distribution from 0 to 2d/r. Likewise, after doubling, 2z, now, is scaled by the distance d, which here comprises 1 m or 0.001 km. Thus, for this example, the ranking factor is, as shown in Table 1 below. Other examples are provided in the table as well.

TABLE 1

| Possible result no. | d (distance to possible result) | σ (2 d/r) | z (e.g. from the table in FIG. 9) | ranking factor (d * 2 * z) |
|---|---|---|---|---|
| 1 | 1 m | .002/.1 = .02 (e.g., 2 * 1 m/ 100 m) | .0080 | .001 * 2 * .0080 = 1.6E5 |
| 2 | 100 m | 2 | .4772 | .09544 |
| 3 | 200 m | 4 | .4999 | .199996 |
| 4 | 500 m | 10 | .5 | .5 |
| 5 | 1 km | 20 | .5 | 1 |
| 6 | 1.6 km | 32 | .5 | 1.6 |
| 7 | 3 km | 60 | .5 | 3 |
| 8 | 5 km | 100 | .5 | 5 |
| 9 | 6 km | 120 | .5 | 6 |

The ranking factor refers to a probabilistic-adjusted distance, or a distance between a search result and an estimated location of a mobile device that may be adjusted based, at least in part, on a probability of an estimated location. As noted above, a ranking factor may in some situations be referred to as a distance penalty for search results that are comparatively further from an estimated location of a mobile device than other search results.

Another example is used to further illustrate computing a ranking factor. For instance, in one case, a radius of 5 km may be desired to be employed for a probable location region having a 95% level of confidence. Table 2 provides example computations similar to Table 1.

TABLE 2

| Possible result no. | d | σ | z | ranking factor |
|---|---|---|---|---|
| 1 | 1 m | .001/2.5 = .0004 | .001 | .000002 |
| 2 | 100 m | .04 | .0160 | .0032 |
| 3 | 200 m | .08 | .0319 | .01276 |
| 4 | 500 m | .2 | .0793 | .0793 |

TABLE 2-continued

| Possible result no. | d | σ | z | ranking factor |
|---|---|---|---|---|
| 5 | 1 km | .4 | .1154 | .3108 |
| 6 | 1.6 km | .64 | .2389 | .76448 |
| 7 | 3 km | 1.2 | .3849 | 2.3094 |
| 8 | 5 km | 2 | .4772 | 4.772 |
| 9 | 6 km | 2.4 | .4918 | 5.9016 |

Comparing Table 1 and Table 2 reveals a difference. For instance, for a radius of 100 m, a ranking factor appears to increase more quickly in a relative sense, by comparison, as distance from a location estimate increases. In contrast, a ranking factor may increase more slowly, in comparison, for a relatively large radius. Table 3 by comparison illustrates a situation in which radius increases with a fixed d of 1 km.

TABLE 3

| Possible uncertainty values | radius (in km) | σ | z | ranking factor |
|---|---|---|---|---|
| 1 | 30 m | 333 | .5 | 1 |
| 2 | 100 m | 10 | .5 | 1 |
| 3 | 200 m | 5 | .5 | 1 |
| 4 | 500 m | 2 | .4772 | .9544 |
| 5 | 1 km | 1 | .3413 | .6826 |
| 6 | 1.6 km | .625 | .2324 | .4648 |
| 7 | 3 km | .333 | .1293 | .2586 |
| 8 | 5 km | .2 | .0793 | .1586 |
| 9 | 6 km | .166 | .0636 | .1272 |

Consistent with the foregoing, in one embodiment, for cases of relatively low radius (e.g., 30 m, 100 m, and 200 m), a distance penalty (e.g., ranking factor) may be determined to be such that distance from a location estimate is not significantly adjusted in weighting and, thus, may not significantly alter ranking. However, as radius increases, weighting may be lower. As such, in one embodiment, as a radius increases, potentially illustrating higher uncertainty, a weight may be reduced relative to other factors used in ranking search results, making a location estimate less influential.

Continuing the description of FIG. 2, at block 210, a list of possible search results may be ranked in response to a search query, such as in ascending order of distance. As discussed above, ranking of search results may be based, at least in part, on any number of possible factors including, but not limited to, location and/or distance factors, quality factors, etc. Further, as discussed, one or more of these factors may be weighted relative to other factors. As alluded to previously, a similar approach may be employed in weighting other factors to account for estimation uncertainty, such as to user preferences, user demographics, etc. Of course, the foregoing examples are not to be understood in a limiting sense.

Other methods of weighting a location estimate may also be used including, but not limited to, measurements to estimate device movement. By way of non-limiting example, movement detection (e.g., via an accelerometer, as one example) may indicate a rate exceeding speeds likely to occur on foot, such as, by way of example, a user carrying a device and being aboard a car or a bus. Thus, in one embodiment, a ranking factor as to location may comprise a factor related to a vehicle, such as for situations that indicate vehicle movement may be occurring. Access to points-of-interest via vehicles such as, for example, cars, may serve to effectively make potential distance variations as to possible search results less significant. For example, while a difference between two possible search results 1 km away and 3 km away may be worth accounting for if walking, such differences would likely be less significant for other forms of movement, such as via a vehicle. Therefore, instead of using linear weighting, it may, in some embodiments, be desirable to employ a non-linearly derived ranking factor for search results in which circumstances suggest distance may be a less significant hindrance. As one example, a ranking factor used in connection with a location estimate may be adjusted, such as, for example, multiplication by 1.2. Referring to Table 2, for example, potential results for items 6, 7, 8, and 9 (corresponding to d of 1.6, 3, 5, and 6 km) may be 0.917376, 2.77128, 5.7264, and 7.08192, respectively. Thus, potential search results may be ranked differently in an embodiment based, at least in part, on proximity and/or an estimate of movement. Of course, this is merely on example approach. Various other types of weighting, such as non-linear weighting, may be implemented.

Another example of using location to affect ranking of search results may comprise a neighborhood type adjustment. For instance, in some cases, a given area, such as, for example, an urban area, as one example, may be further subdivided into smaller areas, such as neighborhoods, which, though they do not traditionally comprise formal geo-political regions, might include certain aspects of interest to users, such as cultural and/or historical aspects, by way of non-limiting example. Thus, for example, a user located in San Francisco's Mission District, may, via a client device, submit a search query seeking, for instance, a store or a restaurant. In this example, search results that may be produced may, for example, be based, at least in part, on a neighborhood adjustment that may provide more weight for search results also located in the Mission District. In one embodiment, a neighborhood bonus may comprise an adjustment factor which may be multiplied by an existing weight for ranking. Thus, in one non-limiting example, a restaurant located in a desired neighborhood may have an existing ranking factor related to distance from a location estimate, as previously described, but now it may be multiplied by 0.8 substantially in accordance with a neighborhood adjustment, for example. Thus, with respect to ranking of search results, an adjustment factor may make a particular search result more appealing, as an example, in spite of its relatively greater distance if it is determined to be within a desired neighborhood, for example. Of course, this is but one potential example of the use of a neighborhood bonus or similar factor for ranking. Again, many other approaches to make weight adjustments for a neighborhood, for example, are possible and intended to be included within claimed subject matter.

It is likewise noted that, as a result of time passing, in an embodiment, it may be appropriate to adjust a radius to reflect increasing uncertainty with respect to a location estimate, for example. Of course, uncertainty may be incremented according to any number of other possible methods and claimed subject matter is not intended to be limited to a particular approach. Furthermore, it may be alternately and/or in addition be desirable to adjust confidence level; that is, for example, rather than increase radius for a location estimate, confidence level may be adjusted to reflect increasing uncertainty. However, likewise, both may be adjusted as well. Of course, confidence level, similar to radius, for example, may also be adjusted via any of a variety of possible methods and claimed subject matter is not intended to be limited to a particular approach. Likewise, adjustments, such as the foregoing, may also be employed to revise a location estimate, for example, as well, which may affect ranking, as previously described. As was noted previously, many possible methods of ranking search results may be employed.

Claimed subject matter is not intended to be limited to a particular approach.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, OS X, Linux, a mobile operating system, such as iOS, Android, Windows Mobile, Windows Phone, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical transformation. Rather, the foregoing is intended as illustrative examples.

One skilled in the art will recognize that a virtually unlimited number of variations to the above descriptions are possible, and that the examples and the accompanying figures are merely to illustrate one or more particular implementations for illustrative purposes. They are not therefore intended to be understood restrictively.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
   estimating, by a network-connected device, a location of a mobile device and a radius of a probable location region; and
   providing search results to the mobile device using a ranking factor generated from the estimated location and the radius as factors in ranking search results.

2. The method of claim 1, wherein the estimated location and the radius are based at least in part on signals received from a source external to the mobile device.

3. The method of claim 1, wherein the radius is determined based at least in part on one or more dynamic IP addresses of the mobile device.

4. The method of claim 1, wherein the radius is based at least in part on a confidence threshold such that there is a 95% probability that the mobile device is located within a region characterized by the radius.

5. The method of claim 1, wherein the radius is based at least in part on a confidence threshold expressed as a probability that the mobile device is located within a given geo-political area.

6. The method of claim 1, wherein the estimated location and the radius are based, at least in part, on one or more IP addresses of the mobile device.

7. The method of claim 1, wherein the radius is based at least in part on a measure of movement of the mobile device.

8. A system comprising:
   a computing device comprising one or more processors;
   the one or more processors of the computing device to estimate a location of a mobile device and a radius of a probable location region, and provide search results to the mobile device using a ranking factor generated from the estimated location and the radius to rank search results.

9. The system of claim 8, wherein the estimated location and the radius are to be based at least in part on signals to be received from a source external to the mobile device.

10. The system of claim 8, wherein the radius is to be determined based at least in part on one or more dynamic IP addresses of the mobile device.

11. The system of claim 8, wherein the radius is to be based at least in part on a confidence threshold such that there is to be a 95% probability that the mobile device will be located within a region characterized by the radius.

12. The system of claim 8, wherein the radius is to be based at least in part on a confidence threshold to be expressed as a probability that the mobile device is to be located within a given geo-political area.

13. The system of claim 8, wherein the estimated location and the radius are to be based, at least in part, on one or more IP addresses of the mobile device.

14. The system of claim 8, wherein the radius is to be based at least in part on a measure of movement of the mobile device.

15. An article comprising:
   a non-transitory storage medium having instructions stored thereon executable to: estimate a location of a mobile device and a radius of a probable location region, and provide search results to the mobile device using a ranking factor generated from the estimated location and the radius as factors to rank search results.

16. The article of claim 15, wherein the storage medium further comprises instructions executable such that the estimated location and the radius are to be based at least in part on signals to be received from a source external to the mobile device.

17. The article of claim 15, wherein the storage medium further comprises instructions executable such that the radius is to be determined based at least in part on one or more dynamic IP addresses of the mobile device.

18. The article of claim 15, wherein the storage medium further comprises instructions executable to increment the radius.

* * * * *